(12) United States Patent
Neubert et al.

(10) Patent No.: US 6,396,608 B1
(45) Date of Patent: May 28, 2002

(54) METHOD AND DEVICE FOR CALIBRATING THE DEVIATION OF A RECEIVED BEAM FROM ITS DESIRED POSITION IN A TERMINAL

(75) Inventors: Jakob Neubert, Zürich; Peter A. Adolph, Basel; Guy Colin Baister, Winterthur, all of (CH)

(73) Assignee: Contraves Space AG, Zuerich (CH)

( * ) Notice: Subject to any disclaimer, the term of this patent is extended or adjusted under 35 U.S.C. 154(b) by 0 days.

(21) Appl. No.: 09/551,756

(22) Filed: Apr. 18, 2000

(30) Foreign Application Priority Data

May 5, 1999 (CH) ................................................ 0847/99

(51) Int. Cl.$^7$ ..................... H04B 10/00; G01B 11/26; G01C 1/00

(52) U.S. Cl. ................. 359/159; 356/141.1; 356/139.07

(58) Field of Search ....................... 359/159; 356/141.1, 356/139.07, 139.08

(56) References Cited

U.S. PATENT DOCUMENTS

| | | | |
|---|---|---|---|
| 4,187,422 A | | 2/1980 | Zoltan |
| 5,030,004 A | * | 7/1991 | Grant et al. ............. 356/141.1 |
| 5,237,166 A | | 8/1993 | Ito et al. |
| 5,841,592 A | | 11/1998 | Herren et al. |

OTHER PUBLICATIONS

Baister et al., "The SOUT Optical Intersatellite Communication Terminal," *IEE Proceedings Optoelectronics,* vol. 141, No. 6, pp. 345–355 (Dec. 1994).

* cited by examiner

*Primary Examiner*—Thomas H. Tarcza
*Assistant Examiner*—Fred Mull
(74) *Attorney, Agent, or Firm*—Townsend and Townsend and Crew LLP; Guy W. Chambers

(57) ABSTRACT

Method for calibrating the deviation of a received beam in a terminal from its desired position. The received beam reaches a receiving sensor, and an acquisition beam an acquisition sensor of the terminal. The detection range of the acquisition sensor is greater than that of the receiving sensor. A portion of a transmitted beam emitted by the terminal to the partner terminal is guided as an incident beam on the reflecting surface, where it is reflected as an outgoing beam. A portion of the outgoing beam is respectively brought to the acquisition sensor and the receiving sensor. A respective measurement for the acquisition sensor and the receiving sensor is performed at least approximately isochronously; the measured results are compared for determining the deviation of the received beam from its desired position. Also a device for calibrating the deviation of a received beam in a terminal from its desired position. The terminal comprises at least one receiving channel with respectively a receiving sensor, a transmitting channel and an acquisition channel with an acquisition sensor. An optical splitting device is arranged in the transmitting channel, which splits the acquisition beam from the transmitting beam and the receiving beam. A reflecting surface reflects the portion of the receiving beam constituting an incident beam as an outgoing beam. Optical means bring the incident beam on the receiving sensor. A measuring and comparing device is used for performing a measurement for the receiving sensor and the acquisition sensor at least approximately isochronously and to compare the results of the measurements in order to determine from them the deviation of the received beam from its desired position. Use of a preferred further development of the device in a terminal equipped with a lead device, which communicates with a partner terminal which is displaceable in respect to it. The triplet beam being created in the course of this is used to calibrate and correct the setting of the lead device.

10 Claims, 4 Drawing Sheets

Figure 1A:
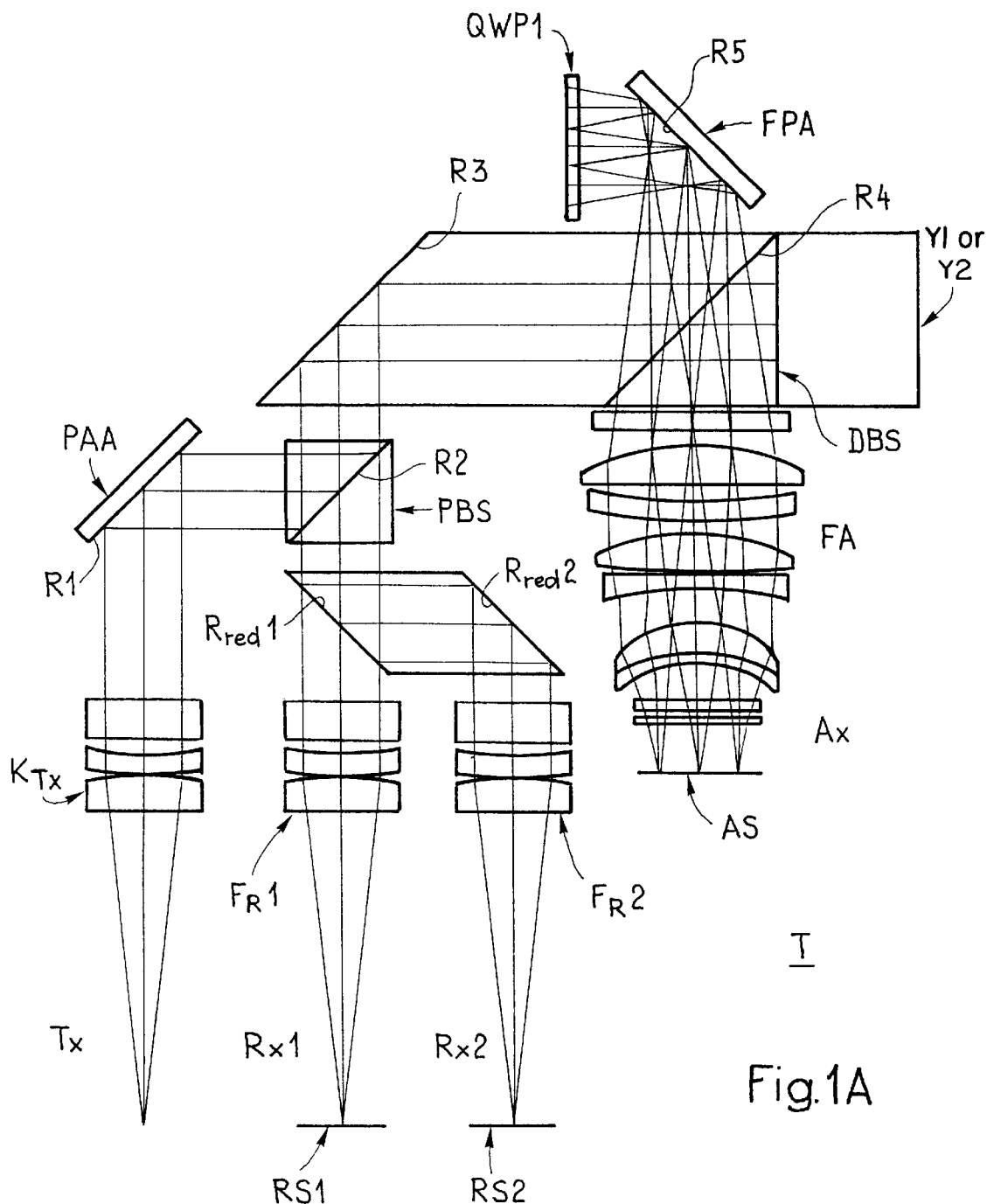

METHOD AND DEVICE FOR CALIBRATING THE DEVIATION OF A RECEIVED BEAM FROM ITS DESIRED POSITION IN A TERMINAL

FIELD OF THE INVENTION

The invention relates to a method and device for calibrating the deviation of a received beam from its desired position in a terminal.

BACKGROUND OF THE INVENTION

Communications between space terminals can be performed by means of optical data transmissions. For this purpose, the various optical units required for this are arranged on an optical bench and a telescope arrangement. For obtaining perfect data transmissions it is necessary that the optical axes of the units arranged on the optical bench take up predetermined, or respectively unvarying, relative desired positions, in general in a parallel orientation, and that tilting of these axes in respect to each other is prevented. Tilting manifests itself in particular in that the received beam does not arrive at its desired position, shows a deviation from this desired position. The reasons for such tilting of the axes of the optical units, which should be prevented, are, for example, the effects of heat and radiation, as well as aging and wear processes within the optical bench. To prevent or to minimize tilting, various steps are usually taken; in particular, the optical bench is designed to be as rigid as possible in order to prevent its bending, and the individual optical units are fixed in place on the optical bench only over a short area of their length, while they are unattached over the remaining length. An optical bench of this type is known from EP 0 844 473 A1, for example.

However, it has now been found that in spite of these steps having been taken, it is not possible in every case to keep the tilting of the optical axes of the optical units within very narrow tolerances in the required way. Moreover, it must be expected that in the future the thermal stresses will increase, on the one hand, which will lead to increasing tilting of the optical axes and, on the other hand, that the requirements regarding the accuracy of the precise mutual alignment of the optical axes will increase.

An additional problem occurs in the course of data transmissions between the mentioned terminal and a partner terminal, which is also located in space; the terminal and the partner terminal generally move in relation to each other. Therefore the transmitted beam must leave the terminal not in the direction of the position taken up by the partner terminal at that moment, but must deviate by a lead angle from this direction, taking the relative motion into account. To achieve this, a terminal usually contains a lead device and a lead sensor (point ahead sensor), i.e. a comparatively expensive device.

SUMMARY OF THE INVENTION

It is the object of the present invention to provide a method and a device for executing it, which will permit the optimal acquisition of the partner terminal, as well as perfect data transmissions, in spite of the usually occurring tilting of the optical axes of different optical units on an optical bench to be expected, as well as perfect data transmissions. It is the further object of the invention to propose a use of a preferred further development of the device of the invention.

In contrast to customary methods, wherein it was attempted to prevent a tilting of the optical axes of the individual optical units in relation to each other to the greatest extent possible, such tilting is tolerated in a novel way in accordance with the principle of the invention. But in order to be able to perform acquisition and data transmissions with perfect results in spite of this, it is necessary to detect this mutual tilting, or respectively the deviations of the axes of two optical units from their relative desired position, or respectively to calibrate it by determining the deviation of the received beam from its desired position. It is possible by means of this to take the effect of tilting on the data transmissions into account. An acquisition channel with an acquisition sensor, whose detection range is considerably greater than the detection range of the receiving channel, is used for the rough alignment of the terminal with its partner terminal. The deviation of the received beam from its desired position means that, in a fictitious projection of an image from the receiving sensor onto an isochronous image of the acquisition sensor, the received beam would be located not at the intended spot, for example in the center, of the image of the acquisition sensor. The mentioned calibration is understood to be the detection of the deviation of the received beam. A reflector unit is arranged for calibration. A small portion of the transmitted beam impinges on a reflecting surface of the reflector unit as the impinging beam and is reflected there as an outgoing beam, which reaches the acquisition channel and the receiving channel. An isochronous measurement is performed in the detection ranges of the acquisition sensor and the receiving sensor. The result of the measurement provides information regarding the deviation of the received beam from its intended position, or respectively provides the data required for the mentioned calibration. This device is simple, cost-effective and light and provides precise results, and this independently of whether the deviation is caused by a tilting of the optical axis of the transmitting or of the receiving channel. It is also advantageous that at least that portion of the deviation caused by tilting of the optical axis of the transmitting channel is doubled by the reflection in the reflector unit, so that a unequivocal signal is generated by this.

The installation of a lead sensor can be avoided in a simple way with the aid of an advantageous further development of the device of the invention; however, for this it is necessary for the reflector unit to have two further reflecting surfaces. The impinging beam is reflected as two further outgoing beams at these additional reflecting surfaces. The total of three reflecting surfaces are located obliquely in relation to each other in such a way that they do not have a common straight line, and their normal surface lines extend in different directions. The three beams constitute a triple beam, which can be employed for calibrating, or respectively correcting, the setting of the lead device. By means of this the arrangement of an additional channel for the lead device can be omitted.

BRIEF DESCRIPTION OF THE INVENTION

Figure 1B:
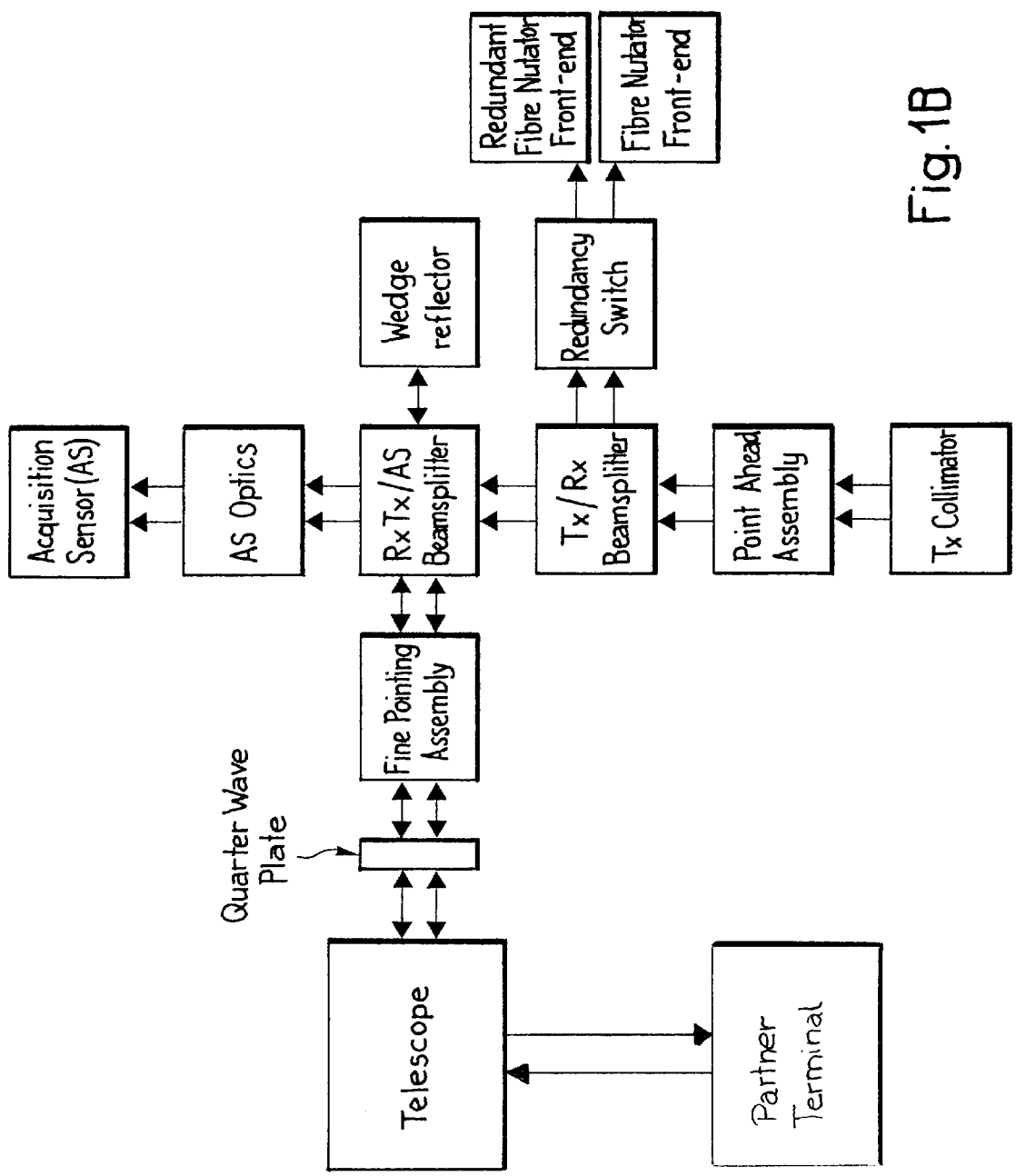
Figure 2:
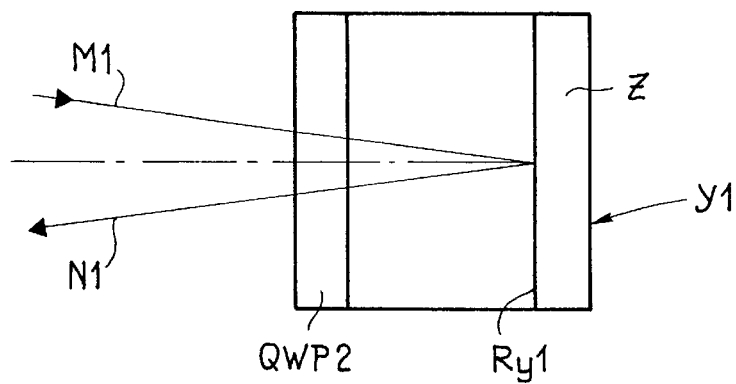
Figure 3:
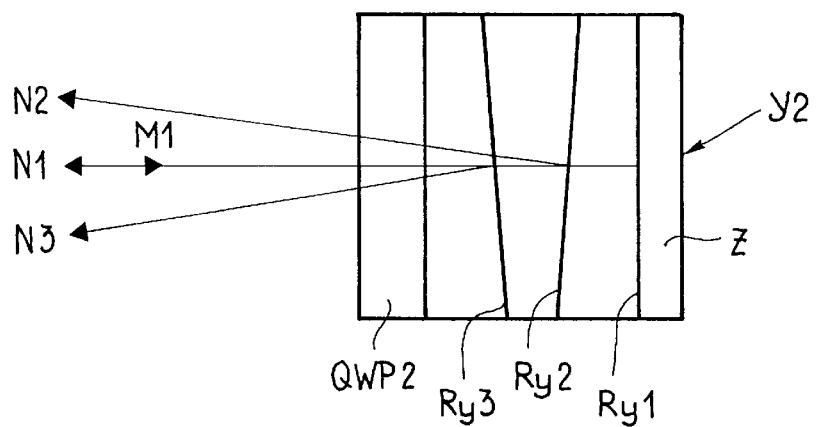
Figure 4A:
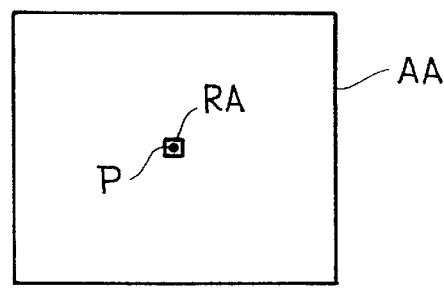
Figure 4B:
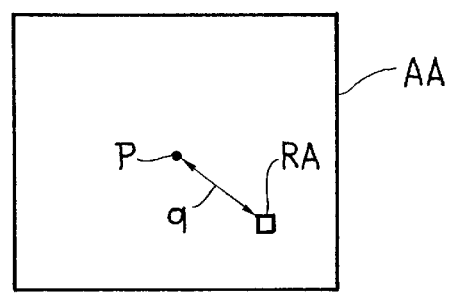
Figure 5A:
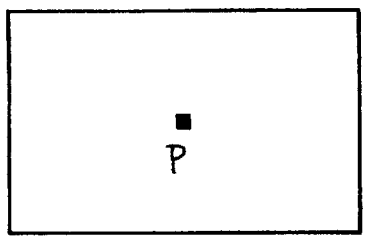
Figure 5B:
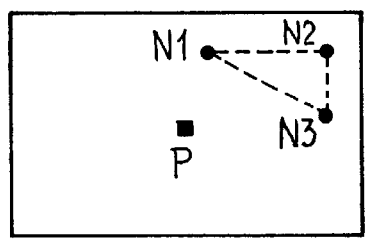
Figure 5C:
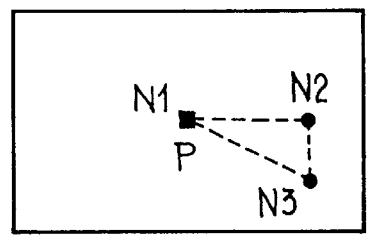
Figure 5D:
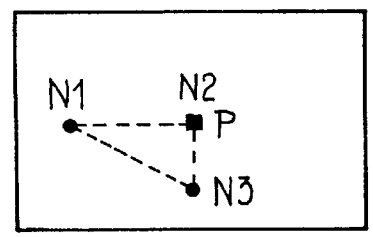
Figure 5E:
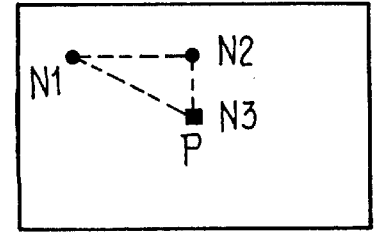

Further properties and advantages of the invention will be explained in what follows by means of a preferred exemplary embodiment, making reference to the drawings. Shown are in:

FIG. 1A, a simplified representation of an exemplary embodiment of a device in accordance with the invention, FIG. 1B, a block diagram for representing the method in accordance with the invention, FIG. 2, a reflector unit with one reflecting surface, FIG. 3, a reflector unit with three reflecting surfaces, FIG. 4A, the reception area of the acquisition sensor with the image of the outgoing beam in its desired position, FIG. 4B, the reception area of the acquisition sensor with the image of the outgoing beam outside of its desired position, FIG. 5A, the reception area of the acquisition sensor with a calibration point, FIG. 5B, the reception area of the acquisition sensor with the image of an impinged triple beam, and FIGS. 5C to 5E, the reception area of the acquisition sensor with the image of the triple beam displaced for calibration purposes in three different calibrating positions.

In the following description, indications such as "top", "bottom", "right", "left", always are in relation to the arrangement in FIG. 1A.

DESCRIPTION OF THE PREFERRED EMBODIMENTS

The device of the invention represented in FIG. 1A is used for executing the method of the invention. The block diagram in FIG. 1B shows the invention in a schematic representation. FIGS. 1A and 1B respectively represent the components of a terminal T relevant to the present invention, wherein the corresponding beam path can also be seen in FIG. 1A.

The terminal T contains three channels, namely a transmitting channel Tx, a receiving channel Rx1 with a branch Rx2 arranged as a redundancy, each with a receiving sensor RS1, or respectively RS2, as well as an acquisition channel Ax with an acquisition sensor AS.

In accordance with FIG. 1A, a collimator device KTx, a first reflecting surface R1, a second reflecting surface R2, a third reflecting surface R3, a fourth reflecting surface R4, a fifth reflecting surface R5 and a quarter-wave plate QWP1 are arranged, viewed in the radiating direction, in the transmitting channel Tx. As extensively described further down below, the first reflecting surface R1 is a portion of a lead device (point ahead assembly) PAA. The second reflecting surface R2 is a component of a polarizing beam splitter PBS, which is designed in such a way that it is reflecting for beams having the same polarization as the transmitted beam, and is transparent and as free as possible of refractions for beams having the same polarization as the received beam. The fourth reflecting surface R4 is constituted by a dichroitic beam splitter DBS. The fifth reflecting surface R5 is constituted by a fine point assembly FPA. The quarter-wave plate QWP1 converts the light of the transmitting channel, which had been linearly polarized up to that point, into circularly polarized light for the transmission through space to the partner terminal.

Also viewed in the radiating direction, the receiving channel Rx1 comprises the quarter-wave plate QWP1, the fifth reflecting surface R5, the dicroitic beam splitter DBS, the third reflecting surface R3, the polarizing beam splitter PBS, a focusing device FR1 and a receiving sensor RS1. As a redundancy, an additional branch of the receiving channel is arranged between the polarizing beam splitter PBS and a further receiving sensor RS2, for which purpose two further reflecting surfaces Rred1 and Rred2, as well as a further focusing device FR2 are provided. The quarter-wave plate QWP1 converts the circularly polarized light of the partner terminal arriving from space into linearly polarized light.

The purpose of the polarizing beam splitter PBS is the differentiation between the transmitted and received beam. In the present exemplary embodiment it is needed, for example, in cases in which the transmitted and received beams differ because of different polarizations. In other exemplary embodiments, wherein the transmitted and received beams differ because of different wavelengths, for example, a DBS would be used in place of the PBS.

The transmitting channel is used for transmitting data to the partner terminal, and the receiving channel is used for receiving data from the partner terminal, each in an operating mode in which the two terminals have already been roughly aligned with each other. A coarse pointing assembly is used for rough alignment; on the one hand, it comprises a light beacon arranged in the partner terminal for emitting beacon light and, on the other hand, the acquisition channel in the terminal for receiving the beacon light. At the dichroitic splitter. DBS, the acquisition channel Ax is separated from the receiving channel Rx and has a focusing device FA, as well as the acquisition sensor AS. The detection range AA of the acquisition sensor AS is considerably greater than the detection range RA of the receiving sensor RS, which can be schematically seen in FIGS. 4A, 4B.

In accordance with the invention, a reflector unit Y1 represented in FIG. 2, is used to detect, or respectively calibrate, the mutual tilting of the optical axes of the transmitting channel Tx and the receiving channel Rx. It has a reflecting surface Ry1 and an absorber Z, which is arranged behind the reflecting surface Ry1 in the beam incidence direction. A small portion of the transmitted beam, namely in this case the leakage light occurring in the dichroitic splitter DBS, is used as the incident beam M1. This has the advantage that an additional energy outlay can be avoided. The incident beam M1 is reflected at the reflecting surface Ry1 of the reflector unit Y1 as an outgoing beam N1, wherein the remainder of the arriving leakage light is absorbed by the absorber Z. The reflected beam N1 thereafter passes through the receiving channel and is detected by the receiving sensor RS. It is obvious that, when impinging on the receiving sensor RS, the beam N1 must be configured the same as the received beam, and that therefore means must accordingly be provided to transform the incident beam M1 into the required configuration of the outgoing beam N1.

FIG. 4A represents a case wherein no mutual tilting of the optical axes of the transmitting channel and the receiving channel exists, so that the area of the receiving sensor RS is in its desired position P within the detecting range of the acquisition sensor AS. A case is represented in FIG. 4B wherein a mutual tilting of the optical axes of the transmitting channel and the receiving channel exists, which leads to a deviation q of the detection range RA of the receiving sensor RS from its desired position P in the detection range AA of the acquisition sensor AS. The qualitative and quantitative extent of this deviation q is used in accordance with the invention for calibrating the mutual tilting of the optical axes. FIGS. 4A, 4B are merely used for illustrating the principle; in actuality the determination of the position of the detection range RA of the receiving sensor RS within the detection range of the acquisition sensor AS does not take place as represented in FIGS. 4A, 4B by a direct comparison within an image, but by separate but isochronous measurements, or one taking place within a small time interval, of the two detection ranges AA, RA.

In the present exemplary embodiment, the reflector unit Y1 moreover has a quarter-wave plate QWP2. This is a means for configuring the outgoing beam N1 in the same way as the received beam. The incident beam M1 and the outgoing beam N1 pass through the quarter-wave plate QPW2, which causes a rotation of the polarization of these beams in such a way that the outgoing beam N1 has the same polarization as the received beam; this is required so that the reflected beam N1 takes the path of the received beam at the polarizing beam splitter PBS. With exemplary embodiments, wherein the incident beam and the outgoing beam differ not by their different polarization but, for instance, by different wavelengths, the quarter-wave plate QWP2 can be omitted.

As already mentioned, the terminal T moreover has the lead device PAA, in order to take into account the relative displacement between the transmitting terminal and the receiving partner terminal, not represented, during the transmitting interval. Setting and calibration of the sensor element of the lead device PAA can be performed by means of a reflector unit Y2, which is represented in FIG. 3. The reflector unit Y2 differs from the reflector unit Y1 in that it has two further reflecting surfaces Ry2 and Ry3 in addition to the reflecting surface Ry1. The three reflecting surfaces Ry1, Ry2, Ry3 are arranged obliquely in respect to each other in such a way that they do not contain a common straight line, and that their normal surface lines do not coincide. Such an arrangement is known per se by the term wedge reflector. The arrangement can be such that the three reflecting surfaces Ry1, Ry2, Ry3 are arranged evenly or unevenly in relation to each other.

FIG. 3 also shows how not only a single outgoing beam is generated from the incident beam M1 by means of the reflector unit Y2, but a triple beam N1, N2, N3, which is propagated into three different directions.

FIG. 5A shows the detection range AA of the acquisition sensor AS with a calibrating position PK, whose meaning will be described in what follows. FIG. 5B shows the detection range AA of the acquisition sensor AS with the image of the triple beam consisting of the beams N1, N2, N3 in the way it impinges. The basis for the correction of the lead setting is obtained by the respective displacement of a beam N1 or N2 or N3 into the calibrating position PK, as represented in FIG. 5C, or respectively 5d, or respectively 5E. The respective configuration of this triple beam consisting of the beams N1, N2, N3 thus can be used for calibrating the tilt angle of the lead device PAA.

What is claimed is:

1. A method for calibrating the deviation of a received beam in a terminal from its desired position, comprising the steps of:
   receiving at a receiving sensor on said terminal a received beam emitted by a partner terminal,
   receiving an acquisition beam emitted by the partner terminal at an acquisition sensor of the terminal, whose acquisition sensor detection range is greater than the detection range of the receiving sensor,
   transmitting a beam emitted from the terminal to the partner terminal wherein said transmitted beam is conducted as an incident beam to a partial reflecting surface, wherein a portion of said incident beam is reflected as an outgoing transmitted beam at the partial reflecting surface,
   further wherein a remaining portion of said incident transmitted beam is conducted through said partial reflecting surface to the acquisition sensor and to the receiving sensor, and
   measurements are performed at least approximately isochronously at the acquisition sensor and the receiving sensor of how the conducted through portion of said incident transmitted beam respectively compares with the received beam and the acquisition beam for determining the deviation of the received beam from its desired position.

2. The method in accordance with claim 1, further comprising the step of
   reflecting the outgoing transmitted beam as two further outgoing beams at two further reflecting surfaces which, together with the first mentioned outgoing beam, form a triple beam consisting of the three beams with different propagation directions.

3. A device for calibrating the deviation of a received beam in a terminal from its desired position, comprising:
   a terminal having at least one receiving channel,
   a receiving sensor for receiving on said receiving channel a received beam emitted by a partner terminal,
   a transmitting channel for emitting a portion of a transmitted beam to the partner terminal,
   an acquisition channel with an acquisition sensor for receiving an acquisition beam emitted by the partner terminal, wherein the detection range of the acquisition sensor is greater than the detection range of the receiving sensor,
   an optical splitting unit arranged in the receiving channel, which separates the acquisition beam from the receiving beam,
   a partial reflecting surface provided for reflecting a portion of said transmitted beam as an outgoing beam and conducting a remaining portion of said transmitted beam to said acquisition and receiving sensors and
   a measuring and comparing unit arranged for performing a measurement for the receiving sensor and the acquisition sensor at least approximately isochronously to ascertain how the conducted through portion of said transmitted beam compares with both the received beam and the acquisition beam to determine from these the deviation of the received beam from its desired position.

4. The device in accordance with claim 3, wherein said partial reflecting surface is a part of a reflector unit, which has an absorber.

5. The device in accordance with claim 4, wherein said reflector unit has two further reflecting surfaces, wherein the three reflecting surfaces are arranged obliquely in relation to each other in such a way that they do not have a common straight line, and their normal surface lines extend in different directions, so that the outgoing beams form a triple beam in three different directions of propagation.

6. The device in accordance with claim 5, wherein
   the three reflecting surfaces are arranged in a regular or irregular position in respect to each other.

7. The device in accordance with claim 5, wherein the triple beam is used for calibrating and for correcting the setting of a lead device.

8. The device in accordance with claim 3, further comprising a quarter-wave plate which is connected upstream of the partial reflecting surface in the direction of the incident transmitting beam, so that the linear polarization of the incident transmitting beam can be converted to the linear polarization of the outgoing beam.

9. The device in accordance with claim 3, further comprising a polarizing beam splitter which reflects the transmitting beam and is transparent for the received beam.

10. The device in accordance with claim 3, wherein said partial reflecting surface comprises a dichroitic beam splitter.

* * * * *